United States Patent
Allison et al.

(10) Patent No.: US 7,882,314 B2
(45) Date of Patent: Feb. 1, 2011

(54) EFFICIENT SCHEDULING OF BACKGROUND SCRUB COMMANDS

(75) Inventors: Brian David Allison, Rochester, MN (US); Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 11/851,487

(22) Filed: Sep. 7, 2007

(65) Prior Publication Data

US 2009/0070648 A1    Mar. 12, 2009

(51) Int. Cl.
*G06F 12/00* (2006.01)
*G06F 13/00* (2006.01)
*G06F 13/28* (2006.01)
*G06F 11/00* (2006.01)
*G11C 29/00* (2006.01)

(52) U.S. Cl. .................. 711/158; 711/167; 714/42; 714/718

(58) Field of Classification Search .......... 711/167, 711/158; 714/42, 718
See application file for complete search history.

(56) References Cited

U.S. PATENT DOCUMENTS

| 5,632,012 A | * | 5/1997 | Belsan et al. .......... 714/6 |
| 7,137,038 B2 | | 11/2006 | New et al. |
| 2001/0047497 A1 | * | 11/2001 | Larson et al. .......... 714/42 |
| 2005/0273646 A1 | * | 12/2005 | Hillier et al. .......... 714/5 |
| 2006/0062048 A1 | * | 3/2006 | Gonzalez et al. ....... 365/185.11 |

* cited by examiner

*Primary Examiner*—Kevin L Ellis
*Assistant Examiner*—Ryan Bertram
(74) *Attorney, Agent, or Firm*—Robert R. Williams

(57) ABSTRACT

A method and apparatus to efficiently scrub a memory, during a scrub period, of a computer system that has a memory comprising a number of memory elements. Examples of memory elements are memory ranks and banks. A memory rank may further comprise one or more banks. The computer system has a memory controller that receives read requests and write requests from a processor. The memory controller includes a scrub controller configured to output more than one scrub request during a particular request selector cycle. The memory controller includes a request selector that services a read request, a write request, or one of the scrub requests during a request selector cycle.

12 Claims, 9 Drawing Sheets

EFFICIENT SCHEDULING OF BACKGROUND SCRUB COMMANDS

CROSS-REFERENCE TO RELATED APPLICATIONS

This application is related to:

U.S. application Ser. No. 11/851,458, filed on Sep. 7, 2007, entitled Scheduling of Background Scrub Commands to Reduce High Workload Memory Request Latency.

FIELD OF THE INVENTION

This invention relates generally to memory controllers in computer systems. More particularly this invention relates to efficiently scheduling scrub commands.

BACKGROUND AND SUMMARY OF EMBODIMENTS OF THE INVENTION

Modern computer systems comprise a memory and a memory controller. In memory, such as DRAMs (Dynamic Random Access Memory) or SRAMs (Static Random Access Memory) for examples, data stored in the memory may become corrupted, for example by one or more forms of radiation. Often this corruption presents itself as a "soft error". For example, a single bit in a block of data read (such as a cache line that is read) may be read as a "0" whereas the single bit had been written as a "1". Most modern computer systems use an error correcting code (ECC) circuitry to correct a single bit error (SBE) before passing the block of data to a processor. The SBE may be a permanent error (a physical error in the memory or interconnection to the memory) or the SBE may be a "soft error".

Some modern computer systems are capable of correcting more than one error in the block of data read. For simplicity of explanation, ECC circuitry herein will be described in terms of correcting single bit errors, but the invention is not limited to computer systems having ECC circuitry that correct only single bit errors.

Soft errors in memory are often corrected by scrubbing. Scrubbing refers to periodically or otherwise reading data, correcting any correctable errors, and writing the corrected data back to memory. Scrubbing is important to prevent a single bit soft error from, over time, becoming a multi-bit error that the ECC circuitry is incapable of correcting.

For example, suppose the ECC circuitry is capable of correcting an SBE, and a first soft error occurs in a particular cache line. The ECC circuitry is capable of correcting the SBE and sending correct data to the processor. Further suppose that the first soft error is left uncorrected, and, after a period of time, a second error (hard or soft error) occurs in the particular cache line. A "hard" error is a permanent error, for example, a broken signal connector, or a failing driver or receiver. The ECC circuitry is not capable of correcting a cache line having two errors, and reports that an error has been detected but can not be corrected, resulting in likely termination of a task requesting the particular cache line, and possibly requiring a re-boot of the computer system.

To reduce the likelihood of uncorrectable multi-bit errors, therefore, memory is scrubbed over a specified scrub period. For example, an entire memory of a computer system may be scrubbed over a twenty four hour scrub period. Specified memory reliability rates rely on completion of scrubbing all memory in the specified period.

A memory controller determines how much memory is connected to the memory controller, determines how many scrub requests must be serviced to scrub the entire memory during the scrub period (e.g., a day), and breaks the scrub period into scrub intervals.

A memory controller sequences through the total number of scrubs required, one scrub command at a time, requiring that a scrub be serviced during each scrub interval.

With reference now to prior art FIGS. 3A and 3B, during a first scrub subinterval of a particular scrub interval, the scrub command will be serviced if doing so does not impact normal read commands issued by the processor, or in some cases, write commands. If the scrub command has not been serviced during the first scrub subinterval of the particular scrub interval, the scrub request escalates to a scrub demand during a second scrub subinterval, at which point, normal command flow (servicing reads and writes issued by the processor) is delayed in favor of the scrub demand, the scrub demand is serviced, and then the normal command flow resumed. Demand scrubs reduce throughput of the computer system because they increase latency of read and write requests, causing a processor to wait for data. This is shown pictorially in FIG. 3B. In FIG. 3B, progress of scrubbing over the scrub period is shown as a straight line over the course of the scrub period (for exemplary purposes, the scrub period is one day). A memory demand workload is shown to increase at about 8 am, remain relatively high until about 5 pm, and then taper off. During Time A and Time C, memory demand workload is relatively light. During Time B, memory demand workload is relatively heavy, and it often occurs that scrub requests can not be serviced during a first scrub subinterval of a scrub interval. To keep on the straight-line "progress", scrub demands, in a second scrub subinterval of the scrub interval, are then enforced, causing scrub requests to be serviced while read requests and write requests issued by the processor wait.

Conventional memory controllers present a single scrub request at a time to a request selector, stepping scrub requests in order through banks and ranks of memory chips in a memory to which a processor makes read and write requests. The request selector is coupled to a read queue, a write queue, a conflict queue, and a scrub controller. If the single scrub request presented would delay a read request (or, possibly a write request in some situations), or can not be performed because of a conflict identified in the conflict queue, the scrub request must wait, often until the second scrub subinterval occurs and a scrub demand must be forced, meaning that the scrub request is handled even at the cost of adding latency to a read request or a write request.

Embodiments of the present invention provide methods and apparatus for reducing or eliminating impact of scrubbing on throughput of a computer system.

A modern computer system, to increase reliability, over a predefined scrub period scrubs an entire memory of the computer system. Each scrub reads a block of data (typically a cache line), checks for errors correctable by ECC (Error Checking and Correction) circuitry, corrects any errors that are found that are correctable, and writes the corrected block of data back into memory. The memory comprises memory elements that require a certain amount of time to read data from or to write data to. In current memory technology, memory elements include memory ranks and banks. For purposes of explanation herein, memory ranks and banks are used as exemplary embodiments of memory elements. A memory rank is a number of memory chips accessed in parallel during a servicing of a read request, a write request, or a scrub request. Each memory chip typically comprises a plurality of banks, as will be shown later in detail. The memory comprises one or more memory ranks, each memory rank having a number of banks. A read access or a write access addresses a particular bank in one or more chips in a particular memory rank. An access to a particular bank in a particular memory rank takes a certain amount of time to complete, and subsequent accesses to that particular bank in the particular memory rank can not be made for the certain amount of time. However, read or write accesses can be made to other banks in the particular memory rank, or to banks in other memory ranks while the particular bank in the particular memory rank is being processed.

In an embodiment of the present invention, a request selector is configured to receive, during a particular request selector cycle, a read request, and more than one scrub requests, each of the more than one scrub requests being to different memory elements (e.g., ranks, or to different banks within a particular memory rank). During the particular request selector cycle, the request selector selects one of the read request, or one of the more than one scrub requests to service.

As more scrub requests from different memory elements (e.g., banks and/or different memory ranks) are presented during the particular request selector cycle to the request selector, the more likely it will be that the request selector is able to service one of the scrub requests with little or no impact to latency of the read request that is received during the particular request selector cycle.

DETAILED DESCRIPTION OF THE PREFERRED EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
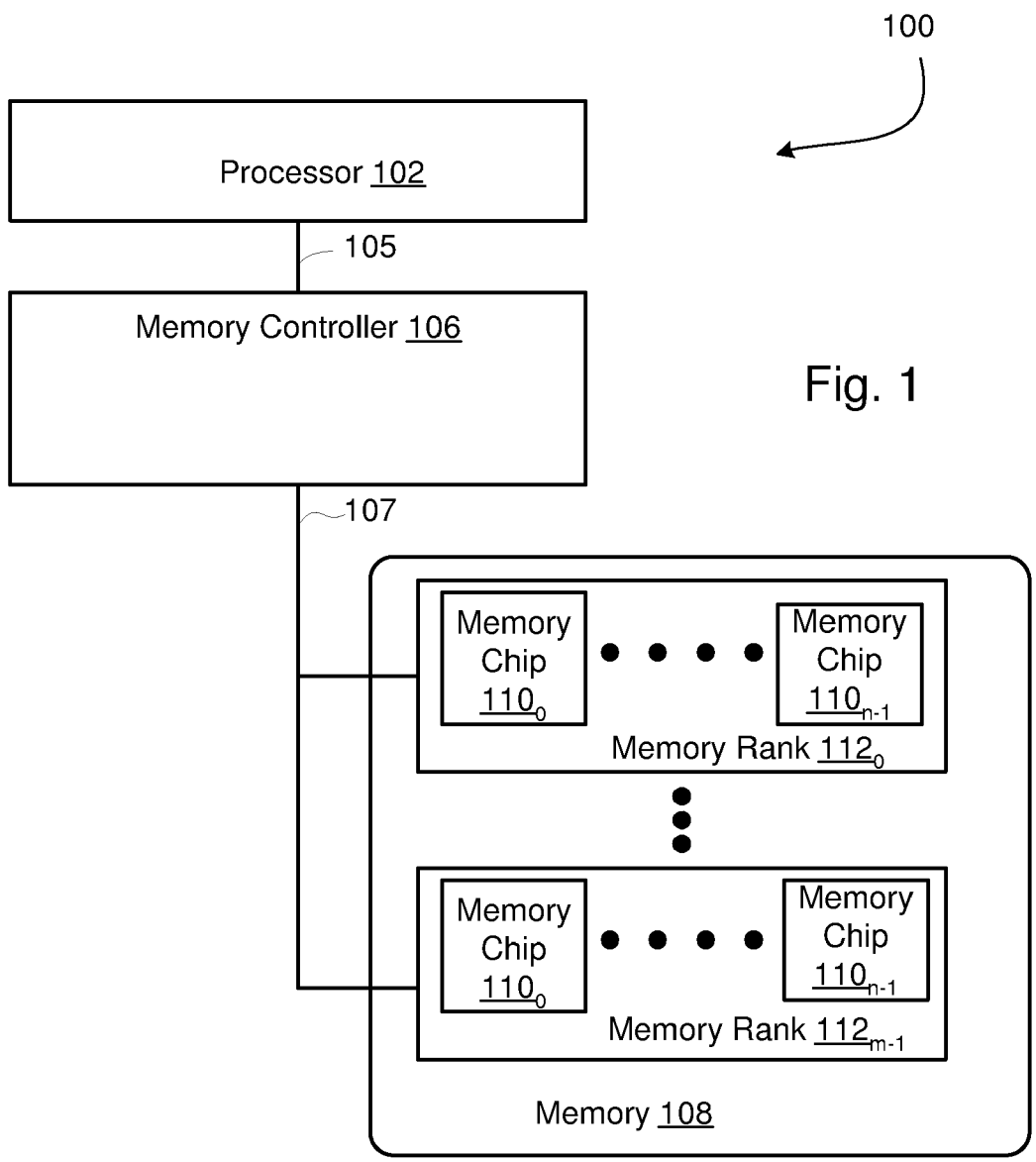
FIG. 1 shows a block diagram of a computer system comprising a processor, a memory controller and one or more ranks of memory.
Figure 2:
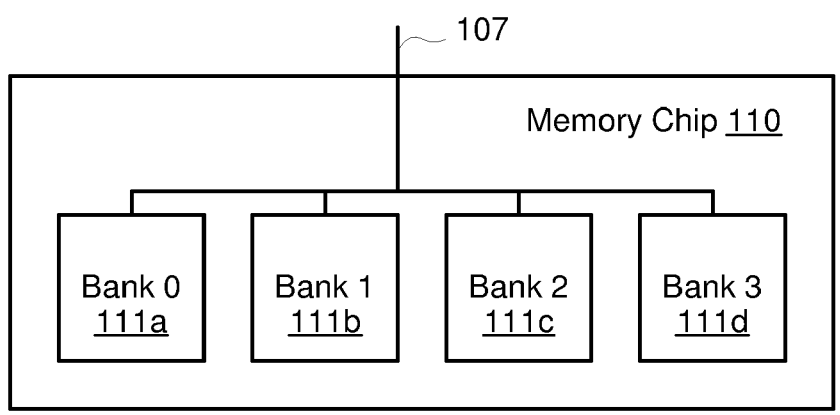
FIG. 2 shows a block diagram of a memory chip comprising one or more banks of memory, used by the computer system of FIG. 1.
Figure 3A:
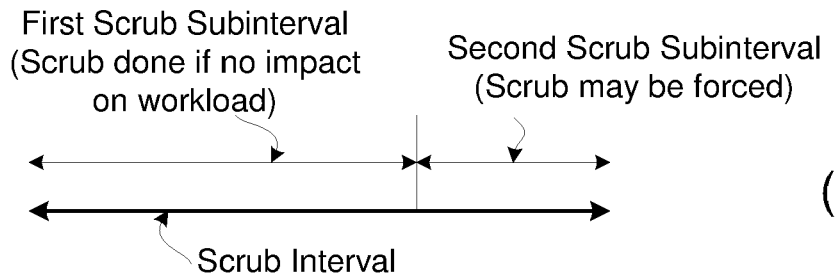
FIGS. 3A and 3B are prior art drawings that illustrate a conventional memory controller's operation of maintaining scrub progress over a predetermined scrub period.
Figure 3B:
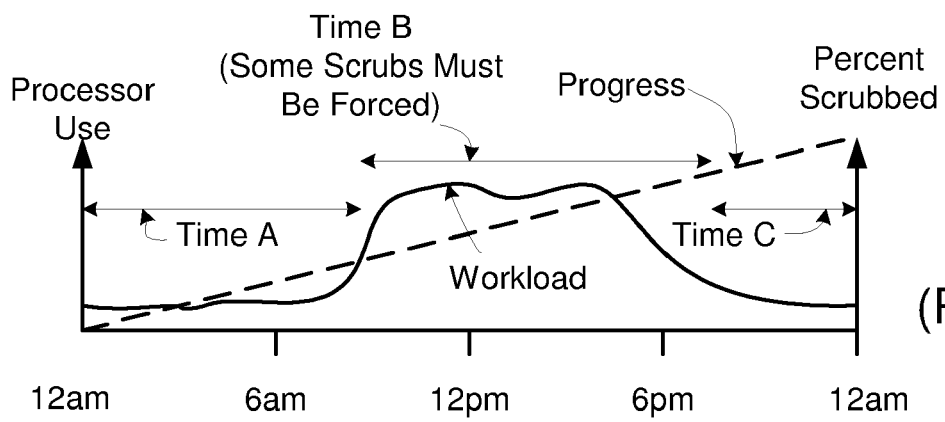

With reference now to the drawings, and, in particular, FIG. 1, computer system 100 is shown. Computer system 100 comprises one or more processor(s) 102, a processor bus 105 that couples processor 102 to a memory controller 106, and a memory 108 coupled to memory controller 106 by a memory bus 107. Memory 108 further comprises one or more memory ranks 112 (shown as memory ranks $112_0$-$112_{m-1}$) of memory chips 110 (shown as memory chips $110_0$-$110_{n-1}$). Memory chips 110 are typically DRAM (Dynamic Random Access Memory) chips. Each memory chip 110 further comprises one or more banks 111 (shown as banks 111a-111d), as shown in FIG. 2. Memory ranks 112 and banks 111 are examples of memory elements. A memory element is a unit of memory that is accessed during servicing of a read request, a write request, or a scrub request issued by memory controller 106. Memory ranks 112 and banks 111 will be used herein as examples of memory elements for purposes of explanation.

It is understood that a typical computer system 100 further includes many other components, such as networking facilities, disks and disk controllers, user interfaces, and the like, all of which are well known and discussion of which is not necessary for understanding of embodiments of the invention.

Figure 4A:
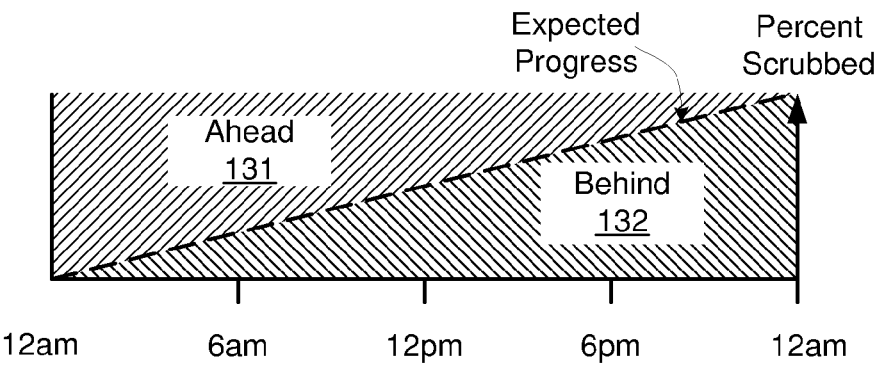
FIGS. 4A-4D show how embodiments of the invention provide for servicing more scrub requests during relatively light memory workload periods and fewer scrub requests during relatively heavy memory workload periods.

Turning now to FIGS. 4A-4D, a high-level overview of results of embodiments of the invention, to be described herein, are seen. FIG. 4A shows, over a predetermined scrub period (one day in the example of FIG. 4A) an expected progress line, that indicates a desired "average" progress in scrubbing the memory. If scrubbing is done at a faster than average scrubbing rate, the percent scrubbed at any given time will be in the area denoted as "ahead 131". If, on the other hand, at a given time, the amount of scrubbing that has been performed is less than the average expected progress, the percent scrubbed by the given time is in the area marked as "behind 132". During times when memory workload is low, embodiments of the invention provide for scrubbing at a faster than average rate in order to get into the ahead 131 area, get higher in the ahead 131 area, or to attempt to escape the behind 132 area. If memory workload is heavy, and the percentage of memory scrubbed is in the ahead 131 area, scrubbing can be done at a lower scrub rate in order to achieve lower latencies on read requests and, in some implementations and situations, write requests.

Figure 4B:
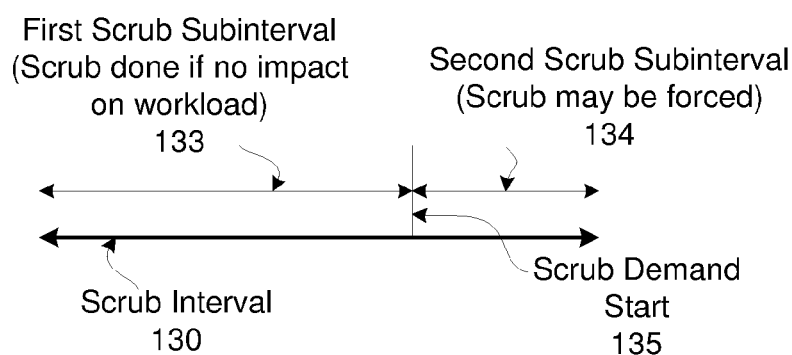

FIG. 4B shows a scrub interval 130, partitioned into a first scrub subinterval 133 and a second scrub subinterval 134, the second scrub subinterval beginning at scrub demand start 135. In scrub interval 133, a scrub request is performed if read latency is not increased, and, in some embodiments, if write latency is not increased. In other embodiments, a first scrub priority is in effect during the first scrub subinterval and a second, higher scrub priority is in effect during the second scrub subinterval.

In an embodiment if a duration of a scrub interval is "X" seconds, a first scrub interval elapses after the "X" seconds, and is immediately followed by a second scrub interval. In an alternative embodiment, if a scrub request is serviced during a third scrub interval, a fourth scrub interval begins immediately upon completion of the servicing of the scrub request instead of waiting for completion of the "X" second duration.

In an embodiment of the invention, scrub interval 130 is lengthened or shortened. Shortening scrub interval 130 causes an increase in instances where scrub requests must be serviced before a read or a write request is handled, thereby increasing a scrub rate. A scrub rate is a rate at which scrubs are performed, for example, "X" scrubs per second. The scrub rate can also be increased by lowering the ratio of the first scrub subinterval to the second scrub subinterval (i.e., moving scrub demand start 135 "to the left" in FIG. 4B) which causes more time to be spent in second scrub subintervals, during which time scrubs may be selected for servicing even if latency of a read or a write is increased. Similarly, increasing duration of scrub interval 130 and/or increasing the ratio of the first scrub subinterval to the second scrub subinterval will reduce the scrub rate.

Embodiments of the invention provide for a first scrub request and a second scrub request being presented to a request selector (request selector 124, to be described later). A plurality of simultaneous scrub requests increases the probability that one of the scrub requests can be serviced without impacting latency of a read request (or, possibly, a write request), thereby also increasing the scrub rate. Any number of simultaneously presented scrub requests is contemplated.

Figure 4C:
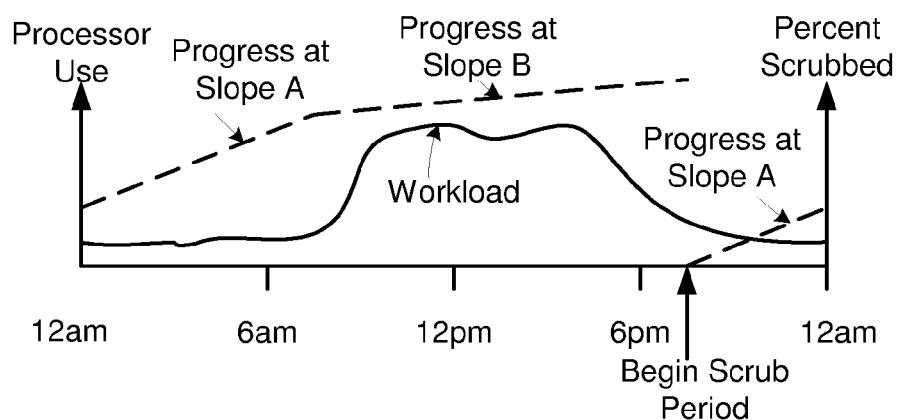

FIG. 4C shows how the scrub rate is determined using knowledge of memory workload variation over a course of a scrub period. In the example of FIG. 4C, it is known that workload is significantly higher during "normal working hours" (shown as approximately 8 am to 5 pm. The scrub period is defined to start at approximately 7 pm, and the scrub rate is programmed (e.g., by shortening scrub interval 130 and/or increasing second scrub subinterval 134). Scrub progress is shown to proceed at a relatively high scrub rate "Slope A" in FIG. 4C. During the expected higher workload during the normal working hours, the scrub rate is reduced to "Slope B" by increasing scrub interval 130 or moving scrub demand start 135 "to the right", that is, reducing the ratio of first scrub interval 133 to second scrub interval 134. Scrub progress at the rate of "Slope B" is shown during heavy memory workload time. In an embodiment, scrub demand 134 is moved such that second scrub interval 134 is "zero", in which case no scrub demands are made, and scrub requests are serviced only if they do not impact latency on reads, and perhaps writes.

Typically, write requests are accumulated in a write queue and write requests are serviced at a lower priority than read requests. However, if the write queue becomes full, the processor may stall because it can no longer transmit a new write request. Therefore, some memory controllers will increase write request priority as the write queue becomes nearly full.

A scrub request can be made without impacting a read (or a write) request in many cases. For example, referring to FIG. 1 and FIG. 2, a first read request is launched and will be handled by bank 111a (bank 0) of memory chips 110 in memory rank $112_0$. That request will take a number of read requestor cycles, depending upon the particular memory chip technology. Upon completion of the read, the bank (111a) may be closed, at which time, data read must be written back to the bank and bit lines must be recharged, taking additional time. The memory controller, therefore can not issue a second read request to memory rank $112_0$, bank 111a (bank 0) for a number of request selector cycles. However, if a scrub request is to a different memory rank, or even a different bank (111b, 111c, 111d) in memory rank $112_0$, that scrub request can be serviced without impacting latency of the second read request.

Because computer system 100 likely has a relatively large memory 108, comprising a number of memory ranks 112, embodiments of the invention raise the likelihood that a scrub request can be serviced without impacting a read request (or a write request) by simultaneously issuing a number of scrub requests to different ranks and/or banks. For example, if memory 108 has eight memory ranks 112, a scrub request is made for each of the memory ranks 112. Alternatively, an embodiment issues scrub requests from each bank 111 of a particular memory rank 112. In yet another embodiment, simultaneous scrub requests are issued for each bank 111 of each rank 112.

Another advantage in issuing scrub requests from multiple ranks and/or banks at the same time is that mechanical or electrical problems are found sooner. For example, in previous memory controllers, scrub requests are issued one at a time, stepping through all the banks 111 in a particular rank 112 before moving on to a different rank 112. Suppose that the scrub period is 24 hours and there are twelve ranks 112. A bad connection, or a bad receiver or driver on a particular signal on the twelfth rank will not be detected during a scrub until the $22^{nd}$ hour of the scrub period, when that rank is finally scrubbed. With the embodiment described (having simultaneous scrub requests from different ranks and/or banks), it is virtually certain that each rank will have at least one scrub request serviced on a frequent basis, and such faults can be dealt with more quickly.

Figure 4D:
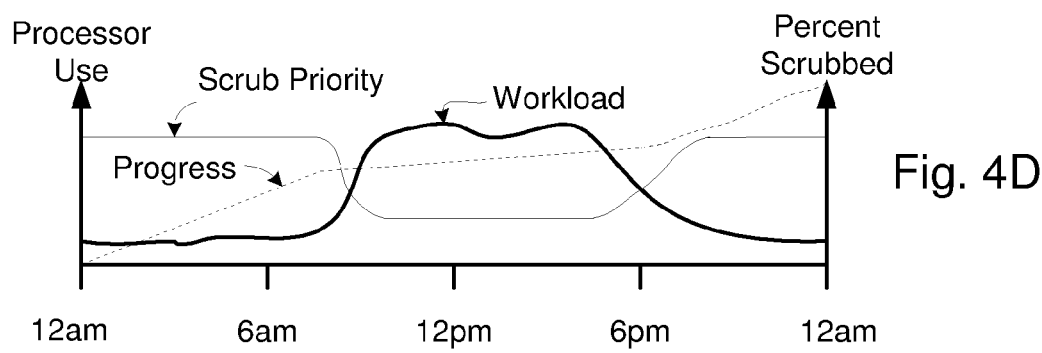

FIG. 4D illustrates another embodiment of the invention that increases the scrub rate as memory workload decreases and decreases the scrub rate as memory workload increases. A scrub priority is determined based upon actual memory workload, versus the predefined estimates of memory workload as described with reference to FIG. 4C.

Figure 5:
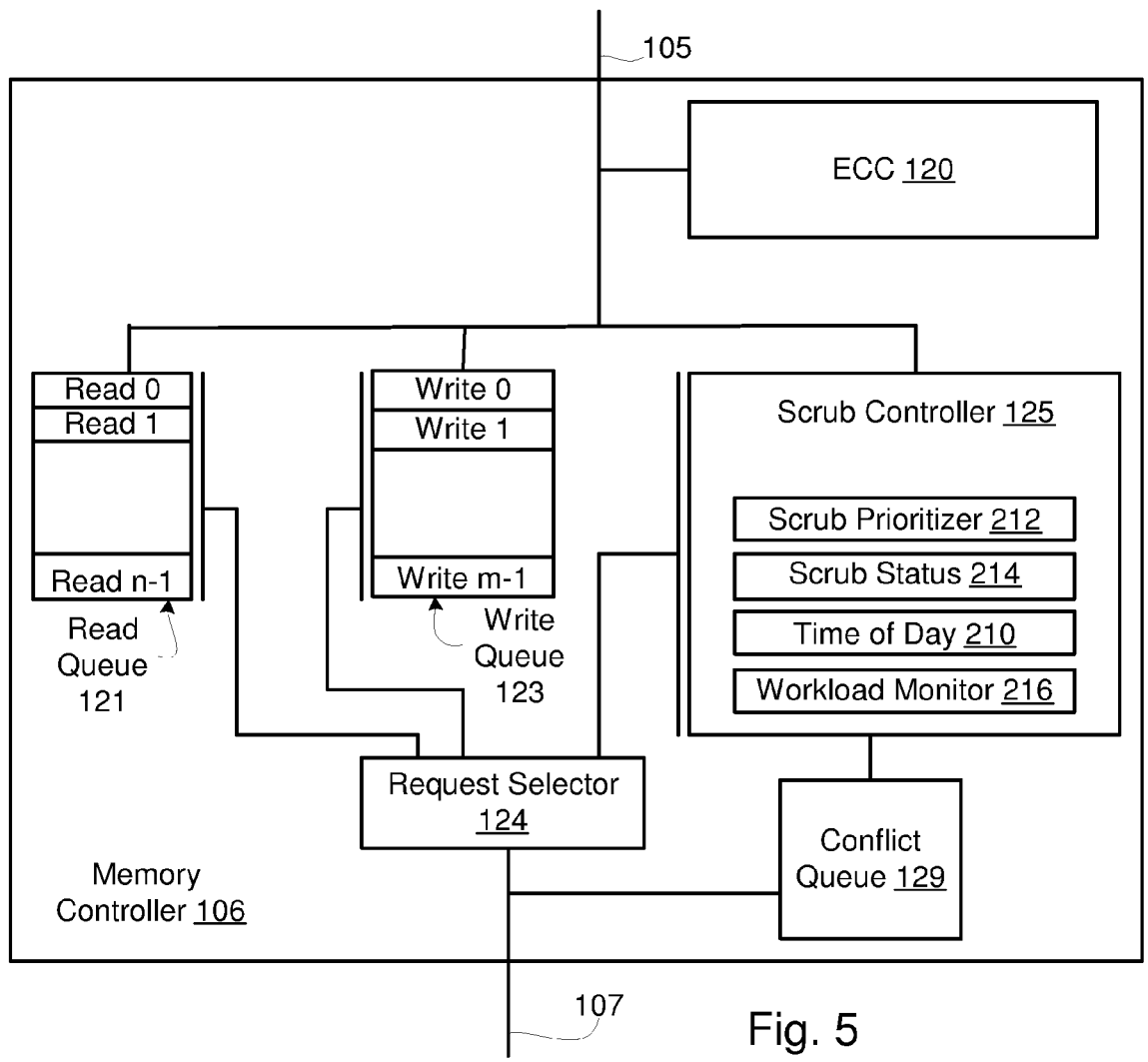
FIG. 5 is a block diagram of a memory controller suitable for use in the computer system of FIG. 1.

FIG. 5 shows a block diagram of memory controller 106. Processor bus 105 couples memory controller 106 to processor 102 as shown in FIG. 1; Memory bus 107 couples memory controller 106 to memory 108 as shown in FIG. 1. It will be understood that, in various implementations, buffer chips (not shown) may be used to buffer signals transmitted to or from memory chips 110. Memory controller 106 comprises a read queue 121 that stores read requests issued by processor 102. Memory controller 106 also comprises a write queue 123 that stores write requests issued by processor 102. Memory controller 106 comprises a scrub controller 125 that issues scrub requests, in embodiments, multiple scrub requests during a particular request selector cycle. A conflict queue 129 is used to manage read, write, and scrub request conflicts.

A request selector 124 selects, during a request selector cycle, a request from read queue 121, from write queue 123, or from scrub controller 125 and issues a selected request on memory bus 107 which will access a particular bank in a particular rank of memory 108. For example, a read request and two scrub requests may be presented to request selector 124 during a request selector cycle, and at the end of the request selector cycle, request selector 124 issues one selected request, chosen from the read request and the two scrub requests, on memory bus 107 (FIG. 5).

Conflict queue 129 knows when each request was issued to memory 108, and to which memory rank 112 and bank 111 each request was issued to. Furthermore, conflict queue 129 knows how long each request will occupy the memory rank 112 and bank 111 to which the request was issued, and will prevent request selector 124 from issuing a subsequent request to that memory rank 112 and bank 111 until that rank and bank again is available.

Memory controller 106 comprises an ECC (Error Checking and Correcting) 120, which will correct a first number of bits having an error read from memory 108 and will detect a second number of bits having an error read from memory 108. ECC 120 ensures that all data sent back to processor 102 on bus 105 is correct, or will signal an error if ECC 120 is unable to correct the data read from memory 108. ECC 120 is also used during scrubbing to correct any correctable bits in error in data read during a read made for a scrub request before the data is re-written into memory 108. During scrubs, scrub controller 125 keeps track of what memory ranks and banks errors have been detected. Repetitive errors from a particular location are identified by scrub controller 125, and may indicate a defective location in memory 108 that may be a faulty data bit, a faulty wire, a faulty driver or a faulty receiver.

Scrub controller 125 may comprise some or all of: a time of day 210, a scrub prioritizer 212, a scrub status 214, and a workload monitor 216, each of which will be introduced now, and described in more detail later.

Scrub controller 125 may comprise a time of day 210 (such as a clock or access to a clock elsewhere in computer system 100). Time of day 210 is used in embodiments of memory controller 106 that adjust the scrub rate based upon predetermined estimates of memory workload.

Scrub controller 125 may comprise a workload monitor 216 that monitors how busy memory system 108 is and scrub controller 125 adjusts the scrub rate accordingly.

Scrub controller 125 comprises a scrub status 214 in which a fraction of memory scrubbed in memory 108, in each memory rank 112, and/or in each bank 111 of each memory rank 112 may be kept.

Scrub controller 125 comprises scrub prioritizer 212 that issues one or more scrub requests to request selector 124.

Figure 6A:
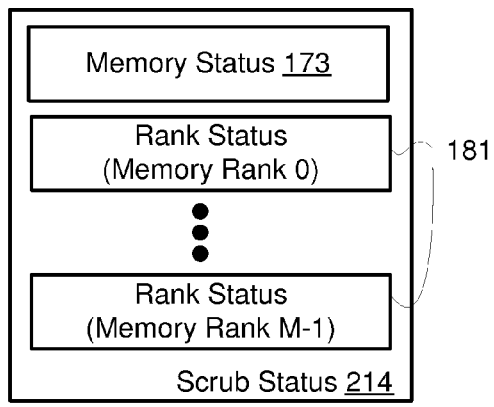
FIGS. 6A-6D show various memory scrub status block diagrams.

Referring now to FIGS. 6A-6D scrub status 214 is shown in more detail. FIG. 6A shows scrub status 214 to include a memory status 173 and a rank status 181 for each rank of memory 108.

Figure 6B:
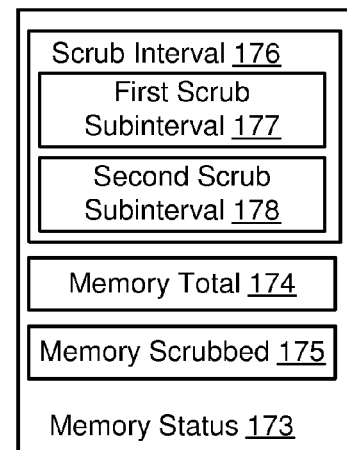

Memory status 173 is shown in more detail in FIG. 6B. Memory total 174 contains a value of a total number, for the entire memory 108, of scrubs that must be performed during the scrub period. Memory scrubbed 175 is reset at a beginning of the scrub period and is incremented each time a scrub request is serviced. A percent of total memory scrubbed is memory scrubbed 175 divided by memory total 174. Scrub interval 176 maintains a value for duration of first scrub subinterval 177, which can be used to specify first scrub subinterval 133 (FIG. 4B), and a value for duration of second scrub subinterval 178 which can be used to specify second scrub subinterval 134 (Fig. B). As explained earlier, durations of the first and second scrub subintervals can be adjusted to increase or decrease the scrub rate. When memory status 173 is used by itself (without the additional "by rank" and/or "by bank" to be described below, scrub rate can be adjusted, but only on a global basis in memory 108.

Figure 6C:
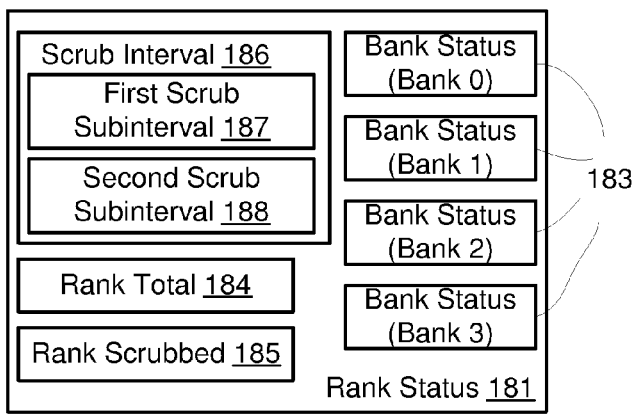

FIG. 6C shows an embodiment of rank status 181. In embodiments of scrub status 214 using a rank status 181, progress of scrubbing is maintained by rank, which is useful to prioritize ranks that are falling behind. For example, if memory rank $112_0$ is 80% scrubbed, but memory rank $112_3$ is only 40% scrubbed, the scrub rate of memory rank $112_3$ should be increased relative to the scrub rate of memory rank $112_0$. Rank total 184 contains the total number of scrub requests that must be serviced to complete scrubbing of the rank. Rank scrubbed 185 is reset at the beginning of the scrub period and is incremented each time a scrub request for the memory rank is serviced. A percentage of scrubbing completed in the rank is the rank scrubbed 184 value divided by the rank total 184 value. A scrub interval 186 contains a first scrub subinterval 187 and a second scrub subinterval 188 that can be used, as described above, to control durations of first scrub subinterval 133 and second scrub subinterval 134 for scrub requests made for an instant rank. Rank status 181 may further comprise a number of bank status 183 which may be used to control scrub rates by bank 111 within a memory rank 112.

Figure 6D:
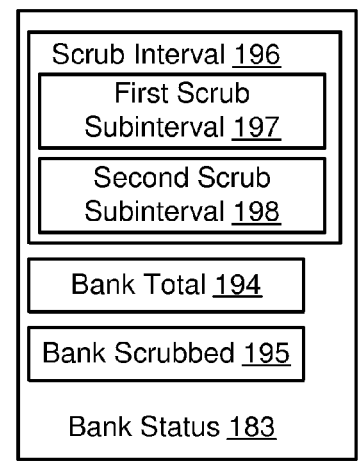

FIG. 6D shows a block diagram of bank status 183. Bank status 183 comprises a bank total 194 which contains a total number of scrubs that must be done over the scrub period. Bank scrubbed 195 is reset at the beginning of the scrub period and is incremented every time a scrub request for that bank is serviced. A percentage of scrubs completed for that bank is the ratio of bank scrubbed 195 to bank total 194. Scrub interval 196 contains first scrub subinterval 197 and second scrub subinterval 198, which may be used as described with other first and second subintervals above to increase or decrease the scrub rate of that bank.

The above discussion has described embodiments wherein scrub rate may be controlled for memory 108 as a whole; by memory rank 112, or by bank 111 within each memory rank 112.

Figure 7:
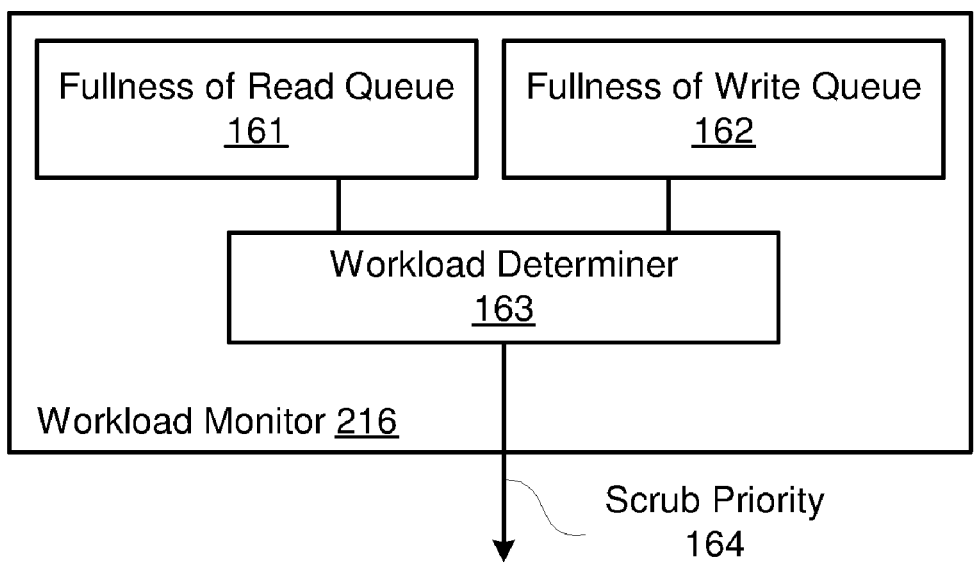
FIG. 7 is a block diagram of a workload monitor embodiment suitable for use in the memory controller.

Workload monitor 216 is shown in FIG. 7. Workload monitor 216 provides an indication of how busy memory 108 is. FIG. 7 shows workload monitor 216 determining how full read queue 121 is using a fullness of read queue 161, and determining how full write queue 123 is using a fullness of write queue 162. Fullness of read queue 161 keeps track of how many entries read queue 121 has versus capacity of read queue 121. As shown in FIG. 5, read queue 121 has room to store "n" requests. A value of zero requests to "n" requests indicates how many read requests are extant in read queue 121. If read queue 121 is full or nearly full, as indicated by fullness of read queue 161, memory 108 is very busy. Similarly, write queue 123 is shown having room for "m" entries, and a value of zero to "m" indicates how many entries currently exist in write queue 123. Fullness of write queue 162 indicates in some manner (e.g., a fraction of maximum capacity) how full write queue 123 is at a given time. If read queue 121 and write queue 123 are relatively empty, for example, each being one fourth or less full, memory system 108 has a relatively low memory workload, and a workload determiner 163 reports this on scrub priority 164. Scrub priority 164 may be a single bit (e.g., "0" being "not busy" and "1" being "busy") or may comprise a plurality of bits to indicate just how light or heavy the memory workload is at a given time. In general, as fullness of read queue 161 and fullness of write queue 162 report increasing fullness, scrub priority 164 reports that memory workload is increasing, and scrub rates are decreased accordingly (e.g., by scrub controller 125 increasing one or more scrub intervals, adjusting the ratios of one or more first scrub subintervals to their respective second scrub intervals, or even eliminating one or more second scrub subintervals).

Alternatively, scrub priority 164 may be applied to request selector 124 directly. For example, assuming a two-bit scrub priority 164, where "00" means that the memory workload is "not very busy", and "11" means that the memory workload is very high, request selector 124, when scrub priority 164 is "00" may issue a scrub request, even if the scrub request impacts latency of three read requests. If scrub priority 164 is "01", request selector 124 may issue a scrub request, even if the scrub request impacts latency of two read requests. If scrub priority is "10", request selector 124 may issue a scrub request if the scrub request impacts latency of one read request. If scrub priority is "11", request selector will not issue a scrub request if doing so would impact latency of a read request. As described earlier, write requests are handled with a lower priority, at least until the write queue begins to become quite full.

Allowing a scrub request to increase latency of a read request (or, perhaps, a write request) when memory workload is light is acceptable, since that same read request, made when memory workload is heavy, would in general, have to wait for a number of other read requests before that read request is serviced. Waiting for one, or a predetermined number of, scrub requests therefore does not slow a read request latency beyond what that read request would incur during times of heavy memory workload. The predetermined number of scrub requests that can be serviced prior to a pending read request could be, for example, equal to an average number of read requests for which a new scrub request would be expect to wait during heavy memory workload times.

Scrub requests during a period when memory workload is light can be serviced prior to one or more read requests, as described, whereas during periods of heavy memory workloads, servicing scrub requests instead of read requests reduces throughput of computer 100. Furthermore, if scrub progress is "behind" as the scrub period is close to ending, scrub rate must be increased in order to complete scrubbing before the end of the scrub period. Therefore, scrub prioritizer 212 advantageously includes both memory work load and "ahead 131" or "behind 132", as well as how much time remains in the scrub period to determine a scrub rate. Expanding therefore on the example above having a two-bit scrub priority 164 to include both workload and amount "ahead 131" or "behind 132" information, together with time remaining in the scrub period, consider the example of the next paragraph.

Again, assume a two-bit scrub priority 164. For the first half of the scrub period, treatment of scrub requests versus read (or, perhaps, write) requests when scrub priority is "00", "01", "10", and "11" are as in the example above. For the next quarter of the scrub period (i.e., scrub period is between 50% and 75% complete), more priority must be given if the scrub progress is "behind". Request selector 124, when scrub priority 164 is "00" may issue a scrub request, even if the scrub request impacts latency of two read requests. When scrub priority is "01", request selector 124 may issue a scrub request if servicing the scrub request impacts latency of five or less read (write) requests. When scrub priority is "10", request selector 124 may issue a scrub request if servicing the scrub request impacts latency of three or less read (write) requests. When scrub priority is "11", request selector 124 may issue a scrub request if servicing the scrub request impacts one or zero read (write) requests. During the last quarter of the scrub period, if scrub progress is "behind", the scrub rate must be given relatively high priority in order to complete scrubbing before the end of the scrub period. For example, when scrub priority is "00", request selector 124 may issue a scrub request if servicing the scrub request impacts sixteen or less read (write) requests. When scrub priority is "01" request selector 124 may issue a scrub request even if servicing the scrub request impacts twelve or less read (write) requests. When scrub priority is "10", request selector 124 may issue a scrub request even if servicing the scrub request impacts eight or less read (write) requests. When scrub priority is "11", request selector 124 may issue a scrub request even if servicing the scrub request impacts four or less read (write) requests. Scrub prioritizer 212 can also use a value of how far a current scrub progress lags "behind" the expected progress to prioritize scrubs. If scrub progress is, for example, only 1% "behind" expected progress, dramatic scrub rate increase does not have to be enforced until very late in the scrub period.

Referring now to FIG. 5, Scrub prioritizer 212 sends one or more scrub requests at a time to request selector 124. As described earlier, sending a plurality of simultaneous requests raises the probability that at least one of the scrub requests can be serviced with no impact on read (or perhaps write) latency, even when memory workload is relatively high. In addition, as also described earlier, sending scrub requests from multiple ranks 112 increases probability that problems with a driver, receiver, or interconnect is discovered earlier than if all scrubbing is completed in a first rank before scrubbing is begun on a second rank. In an embodiment, scrub prioritizer 212 uses only scrub status 214, and sends one or more scrub requests, along with duration of the corresponding first and second scrub subintervals. In a second embodiment, scrub prioritizer sends a scrub request for each memory rank 112, with corresponding first and second scrub subintervals, helping to ensure that no memory rank 112 is allowed to lag significantly behind other memory ranks. For example, suppose that a first memory rank 112 contains one million cache lines that must be scrubbed, and a second memory rank contains only 256,000 cache lines that must be scrubbed. As explained above, each memory rank 112 has a scrub rate proportional to it's percentage of scrubbing performed. If, for a time, the first memory rank 112 and the second memory rank 112 have an equal number of scrubs performed, the first memory rank 112 will fall behind as a percentage of scrubbing performed. The first memory rank will then be given a higher scrub rate (e.g., by shortening scrub interval 130 for first memory rank 112, or by relatively increasing second scrub interval 134 for first memory rank 112, in order that more scrub requests are serviced for first memory rank 112. Alternatively, scrub prioritizer 212, upon noticing that first memory rank 112 is "falling behind" on a percentage basis, issues scrub requests for multiple banks 111 of first memory rank 112 and only one (or no) scrub requests for second memory rank 112.

Figure 8:
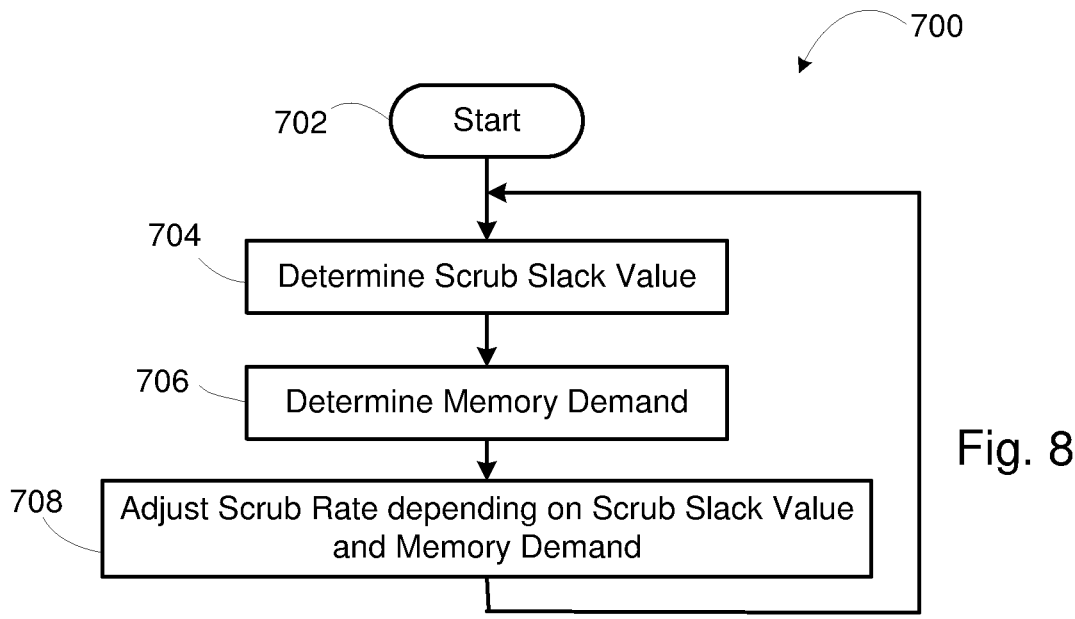
FIG. 8 is a high level flow chart illustrating adjusting rate that scrub requests are service depending upon memory workload.

FIG. 8 shows a high level flow chart of a method embodiment 700 of the invention. Method 700 begins at step 702. In step 704, a scrub slack value is determined. If the scrub slack value is "positive", scrubbing is "ahead of schedule", that is, is in the region denoted ahead 131 in FIG. 4A. If the scrub slack value is "negative", scrubbing is "behind schedule", that is, is in the region denoted as behind 132 in FIG. 4A. In step 706, memory workload is determined, indicating whether the memory is currently very busy handling requests for reads (and, perhaps, writes) that have been issued by a processor. In step 708, a scrub rate is adjusted, using the scrub slack value and the memory workload. If memory workload is relatively low, scrub rate is increased, by prioritizing scrub requests over some number of read (and, perhaps, write) requests, if necessary. If memory workload is relatively high, scrub rate is decreased, allowing few, if any, scrub requests to add latency to a read (or, perhaps, write) request. Similarly, if the scrub slack value begins to become more and more negative, scrub rate is increased to "catch up" so that the entire memory will be scrubbed during a scrub period. The memory workload may be dynamically measured, or an estimate of the memory workload may be stored in the system, for example, by time of day as described earlier.

Figure 9:
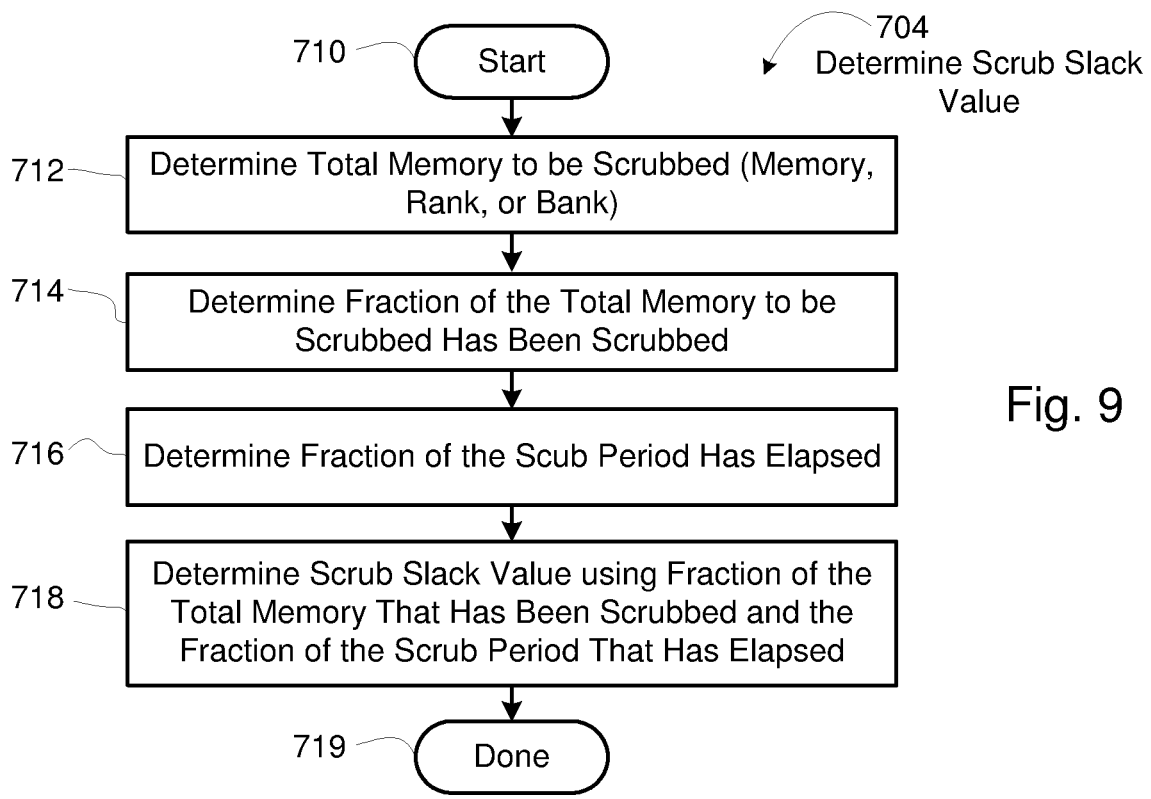
FIG. 9 is a flow chart illustrating how a value for a scrub slack is determined.

FIG. 9 is a flow chart that provides more detailed steps of step 704 of FIG. 8.

Step 710 begins a more detailed embodiment of step 704. Step 712 determines a total memory (number of blocks of data, e.g., cache lines) to be scrubbed in a computer's total memory, in a memory rank, or in a memory bank.

Step 714 determines a fraction (percentage) of the total memory to be scrubbed that has already been scrubbed in a scrub period. For example, if a million scrubs are required to completely scrub a memory, and 500,000 scrubs have been performed, then 50% of the scrubbing for the memory has been completed.

Step 716 determines a fraction (percentage) of the scrub period that has elapsed. For example, if the scrub period is twenty four hours, and six hours have elapsed since a beginning of the scrub period, the scrub period is 25% completed.

Step 718 determines the scrub slack value by subtracting the fraction of the scrub period that has elapsed from the fraction of the scrubbing that has been completed. For example, if scrubbing is 0.75 complete and the scrub period is 0.50 complete, the scrub slack is a positive 0.25.

Other implementations of a scrub slack value are of course, also possible. For example, dividing the fraction of scrubbing that is complete by the fraction of the scrub period that is complete. Using the exemplary fractions above, 0.75/0.50=1.50. In this case, being exactly on the expected progress line of FIG. 4A would have a value of one, instead of the "positive" or "negative" slack that results from subtraction. Being "ahead" would be greater than one; being "behind" would be less than one.

Step 719 completes the expanded method of step 704, which determines scrub slack.

Figure 10A:
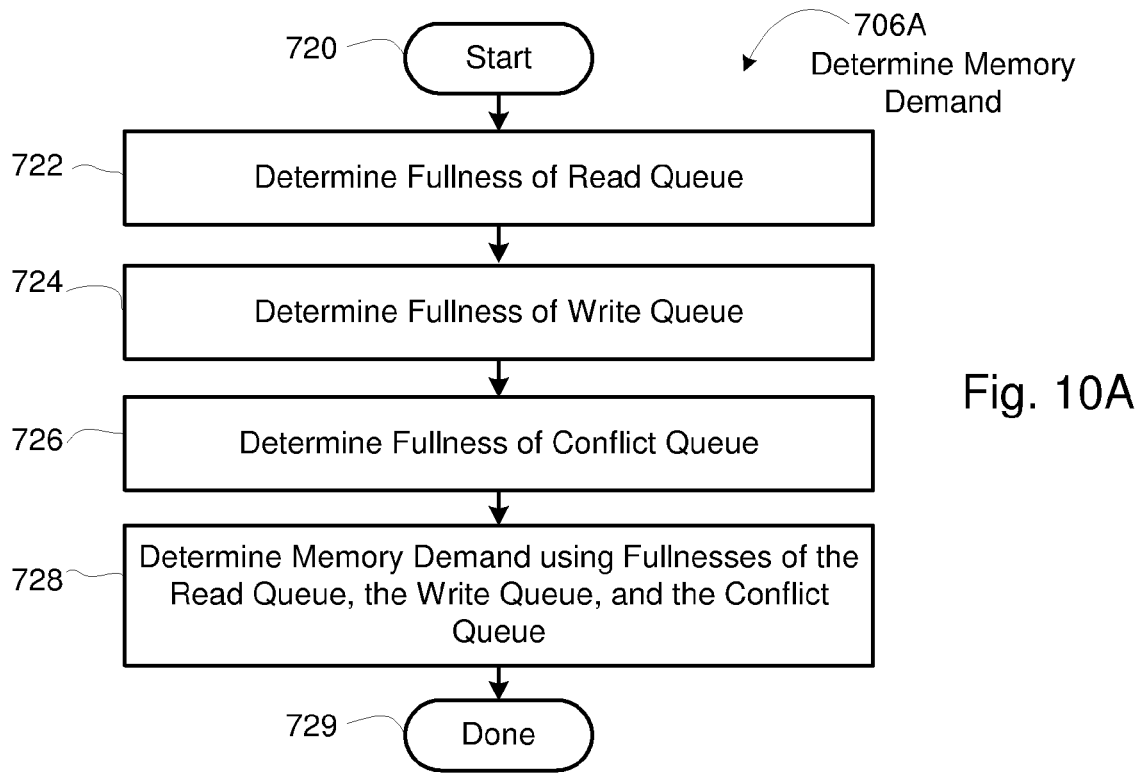
FIGS. 10A and 10B are flow charts showing how memory workload is determined.

FIG. 10A shows a first embodiment of step 706 (FIG. 8) in more detail, denoted 706A in FIG. 10A, beginning at step 720. In step 722, a measurement of fullness of a read queue is made. For example, if the read queue has 32 read request positions, and is currently holding four read requests, the read queue is one eighth full. Step 724 similarly determines fullness of a write queue. Step 726 similarly determines fullness of a conflict queue in implementations having a conflict queue. Step 728 determines memory workload using the values for read queue, write queue, and conflict queue fullness. If one or more of those queues are full or nearly full, memory workload is very heavy; if all of those queues are empty or nearly empty, memory workload is relatively light. Step 729 completes the expanded method of step 706.

Figure 10B:
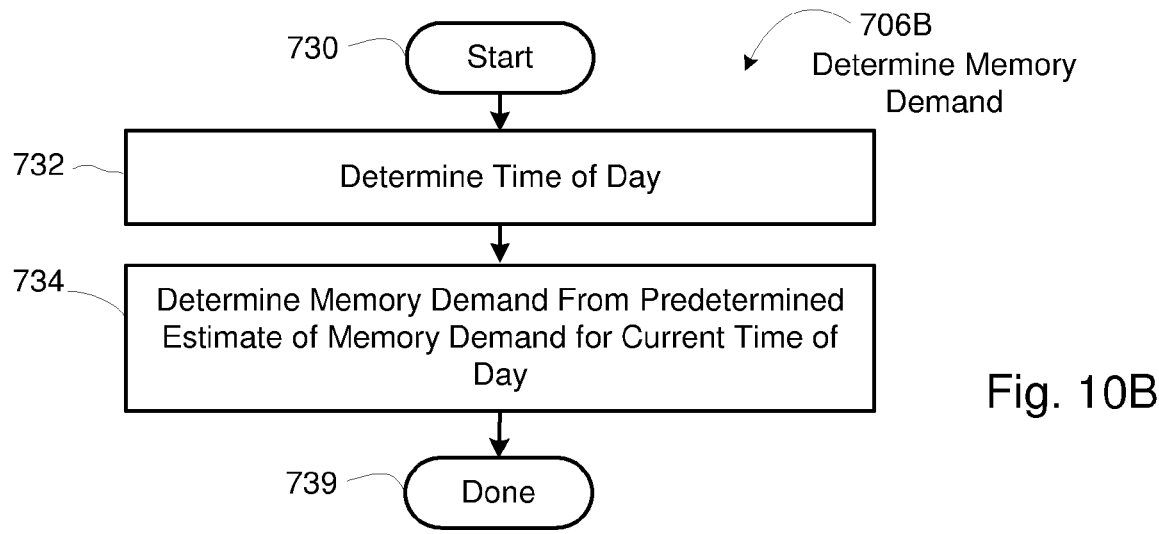

FIG. 10B provides a second embodiment of step 706 (FIG. 8), denoted 706B in FIG. 10B. Step 730 begins method 706B. In step 732, time of day is determined by reading a time of day clock. In step 734, memory workload is determined by using the time of day determined in step 732 and a predetermined estimate of memory workload that is stored in the computer system, for example, in the way of a table of workload demand versus time, or an equation. Step 739 ends method 706B.

Figure 11:
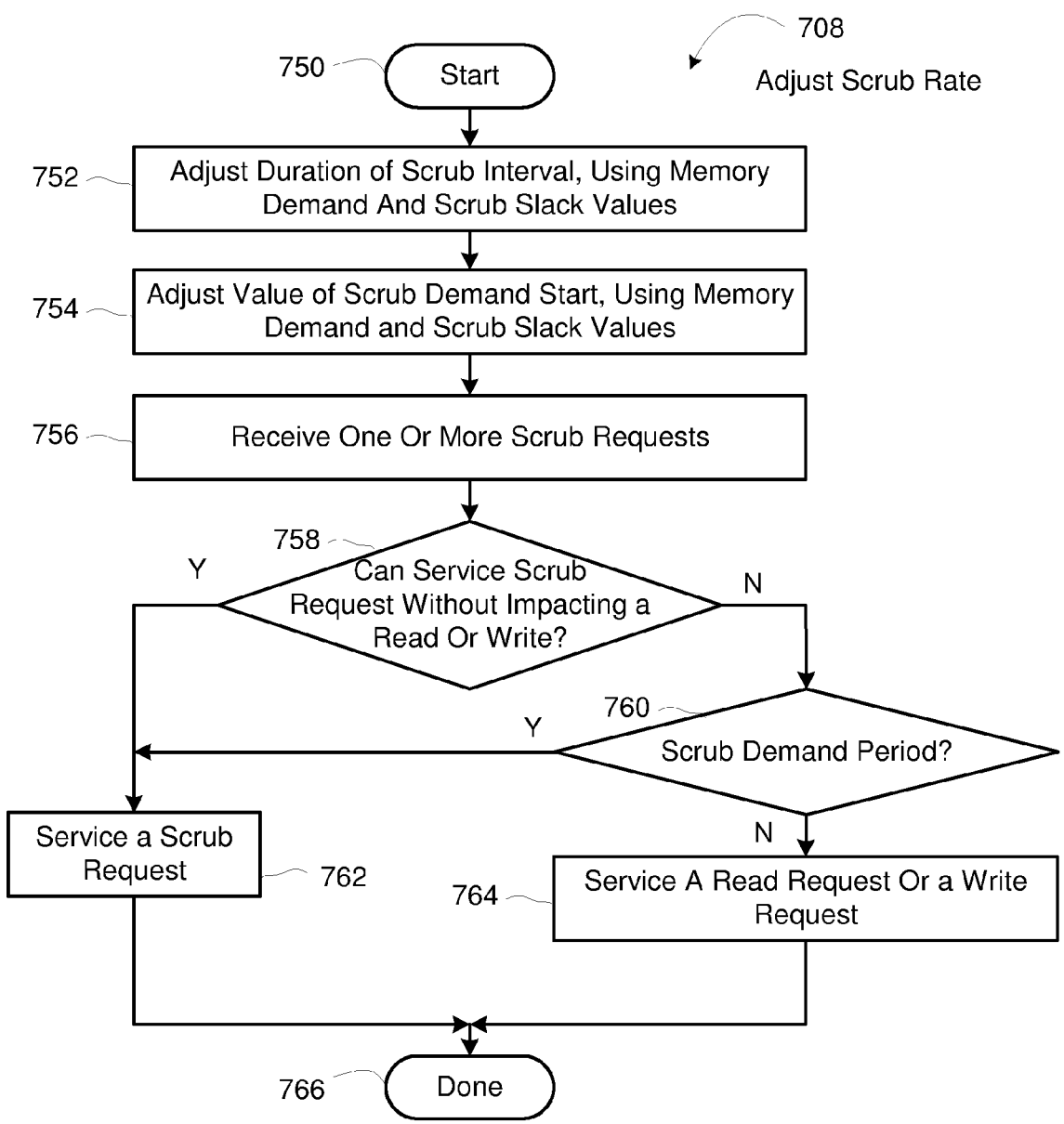
FIG. 11 is a flow chart showing adjustment of a rate of servicing scrub requests using memory demand and scrub slack information.

FIG. 11 is an expansion of step 708 (FIG. 8) which adjusts a scrub rate. Method 708 begins at step 750.

In step 752, a duration of a scrub interval is adjusted, using memory workload and scrub slack value. For example, if the scrub slack value indicates that scrubbing is currently "behind", the scrub interval is made shorter, so that more scrub requests are considered in a given amount of time, and more instances of the second scrub subintervals, where scrubs are forced at the expense of read request (or, perhaps, write request) latency are performed.

In step 754, apportionment of a scrub interval in to a first scrub subinterval and a second scrub subinterval is varied. If the second scrub subinterval is relatively longer, likelihood that a scrub request will be selected over a read request (or, perhaps, a write request) is increased.

In step 756, one or more scrub requests are received by a request selector (such as request selector 124 shown in FIG. 5). Advantageously, a plurality of scrub requests (directed to different ranks and/or banks) are received by the request selector, in order that at least one scrub request can be found that can be serviced without impacting latency of a read (or, perhaps, a write) request.

In step 758, the request selector determines if a scrub request can be serviced without impacting a read (or, perhaps a write) request. If so, the scrub request is serviced in step 762; if not, step 760 determines if a scrub demand period (i.e., a second scrub subinterval) is active. If so, the scrub request is serviced by step 762; if not, a read request (or, perhaps, a write request) is serviced. It will be noted that method 708 of FIG. 11 is simplified for explanation. As explained earlier, depending upon workload and scrub slack, step 758 may branch to step 762 to service a scrub request if memory workload is very light even if one or more read (or, perhaps write) requests are pending.

What is claimed is:

1. A method of scrubbing a memory in a computer system, the method comprising the steps of:
   during a particular request selector cycle, receiving, by a request selector, at least one read request;
   during the particular request selector cycle, receiving, by the request selector, a first scrub request for scrubbing a first block of data in the memory;
   during the particular request selector cycle, receiving, by the request selector, a second scrub request for scrubbing a second block of data in the memory;
   examing a value of a scrub priority;
   when the value of the scrub priority indicates that a memory workload is less than a first value, servicing the first scrub request or the second scrub request; and
   when the value of the scrub priority indicates that the memory workload is above a second value, servicing the read request.

2. The method of claim 1, wherein the first block of data is in a first memory element in the memory and the second block of data is in a second memory element in the memory.

3. The method of claim 1, wherein the first block of data is in a first memory rank in the memory and the second block of data is in a second memory rank in the memory.

4. The method of claim 1, wherein the first block of data is in a first bank in a first memory rank in the memory and the second block of data is in a second bank in the first memory rank in the memory.

5. The method of claim 1, further comprising the steps of:
   determining if a scrub progress for a particular memory rank in the memory is ahead of, or behind, an expected scrub progress for the particular memory rank;
   if the scrub progress for the particular memory rank is behind the expected scrub progress for the particular memory rank, increasing a scrub rate for the particular memory rank;
   establishing a scrub interval during which a scrub request must be serviced, the scrub interval further comprising a first scrub subinterval in which a scrub request is serviced only if read latency of a read request is not increased, and a second scrub subinterval during which a read requests are given higher priority;
   wherein increasing the scrub rate for the particular memory rank comprises the step of shortening the first scrub subinterval and lengthening the second scrub subinterval.

6. The method of claim 1, further comprising the steps of:
   determining if a scrub progress for a particular bank in a particular memory rank in the memory is ahead of, or behind, an expected scrub progress for the particular bank;
   if the scrub progress for the particular bank is behind an expected scrub progress for the particular bank, increasing a scrub rate for the particular bank;
   establishing a scrub interval during which a scrub request must be serviced, the scrub interval further comprising a first scrub subinterval in which a scrub request is serviced only if read latency of a read request is not increased, and a second scrub subinterval during which a read requests are given higher priority;

wherein increasing the scrub rate for the particular memory bank comprises the step of shortening the first scrub subinterval and lengthening the second scrub subinterval.

7. A computer system comprising:
a processor;
a memory further comprising:
a plurality of memory elements;
a memory controller that receives read requests and write requests from the processor and services the read requests and the write requests by making accesses to the memory, the memory controller further comprising:
   a scrub controller configured to output more than one scrub request during a particular request selector cycle;
   a scrub controller configured to determine a scrub priority; and
a request selector that selects, using the scrub priority, during a single request selector cycle, a read request when the scrub priority is lower than a first predetermined value, a write request when the scrub priority is lower than the first predetermined value, or one of the more than one scrub requests to service when the scrub priority is higher than a second predetermined value.

8. The computer system of claim 7, wherein a memory rank is a first type of memory element and a bank is a second type of memory element, the memory rank comprising one or more banks.

9. The computer system of claim 7, the memory controller configured to determine a scrub progress of a memory element.

10. The computer system of claim 9 further configured to increase a scrub rate of a particular memory element that is behind an expected rate of scrubbing.

11. The computer system of claim 10, wherein the particular memory element is a memory rank, the memory rank further comprising a plurality of banks, the scrub prioritizer configured to increase a scrub rate for the particular memory element by issuing, for a single request selector cycle, scrub requests for more than one bank in the plurality of banks.

12. The computer system of claim 10, wherein the particular memory element is a particular bank among a plurality of banks in a memory rank;
   wherein the scrub rate for the particular bank is increased by increasing a number of scrub requests in a unit of time for the particular bank.

* * * * *